United States Patent
Chang

(10) Patent No.: US 8,909,911 B2
(45) Date of Patent: Dec. 9, 2014

(54) POWER-ON/OFF MANAGEMENT SYSTEM AND METHOD OF COMMUNICATION DEVICE

(75) Inventor: Han-Zen Chang, Tu-Cheng (TW)

(73) Assignee: Chi Mei Communications Systems, Inc., New Taipei (TW)

( * ) Notice: Subject to any disclaimer, the term of this patent is extended or adjusted under 35 U.S.C. 154(b) by 681 days.

(21) Appl. No.: 13/167,723

(22) Filed: Jun. 24, 2011

(65) Prior Publication Data

US 2012/0278601 A1  Nov. 1, 2012

(30) Foreign Application Priority Data

Apr. 26, 2011 (TW) .................................. 100114536

(51) Int. Cl.
*G06F 1/32* (2006.01)

(52) U.S. Cl.
CPC .................................... *G06F 1/3203* (2013.01)
USPC ................................................. 713/2; 713/1

(58) Field of Classification Search
USPC ......... 713/1, 2, 100, 300, 310, 320, 321, 322, 713/323, 324, 330, 340, 375
See application file for complete search history.

(56) References Cited

U.S. PATENT DOCUMENTS

| | | | |
|---|---|---|---|
| 2007/0149256 A1* | 6/2007 | Burgan et al. ................. | 455/574 |
| 2008/0263349 A1* | 10/2008 | Ota et al. .......................... | 713/2 |
| 2012/0265974 A1* | 10/2012 | Shen ................................ | 713/1 |

* cited by examiner

*Primary Examiner* — Kim Huynh
*Assistant Examiner* — Paul J Yen
(74) *Attorney, Agent, or Firm* — Novak Druce Connolly Bove + Quigg LLP

(57) ABSTRACT

In a power-on/off management method of a communication device, a display screen of the communication device is powered off, and a signal transmitting function of the communication device is suspended, when a power key of the communication device is pressed upon the condition that the communication device is in a power-on state. A duration time of how long the display screen is powered off is determined, and the communication device is activated according to the duration time when the power key is pressed upon the condition that the display screen is powered off.

6 Claims, 2 Drawing Sheets

POWER-ON/OFF MANAGEMENT SYSTEM AND METHOD OF COMMUNICATION DEVICE

BACKGROUND

1. Technical Field

Embodiments of the present disclosure relate generally to power management of communication devices, and more particularly, to a power-on/off management system and method of a communication device.

2. Description of Related Art

Communication devices, such as smart phones and feature-rich mobile phones, are widely used. The communication devices may often be powered off for some particular occasions, such as when a user is at a meeting, and later re-powered on when necessary. However, more and more applications are installed on the communication device to provide more functions. Therefore, it may cost much time to power on the communication devices due to the increasing number of applications installed.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

Figure 1:
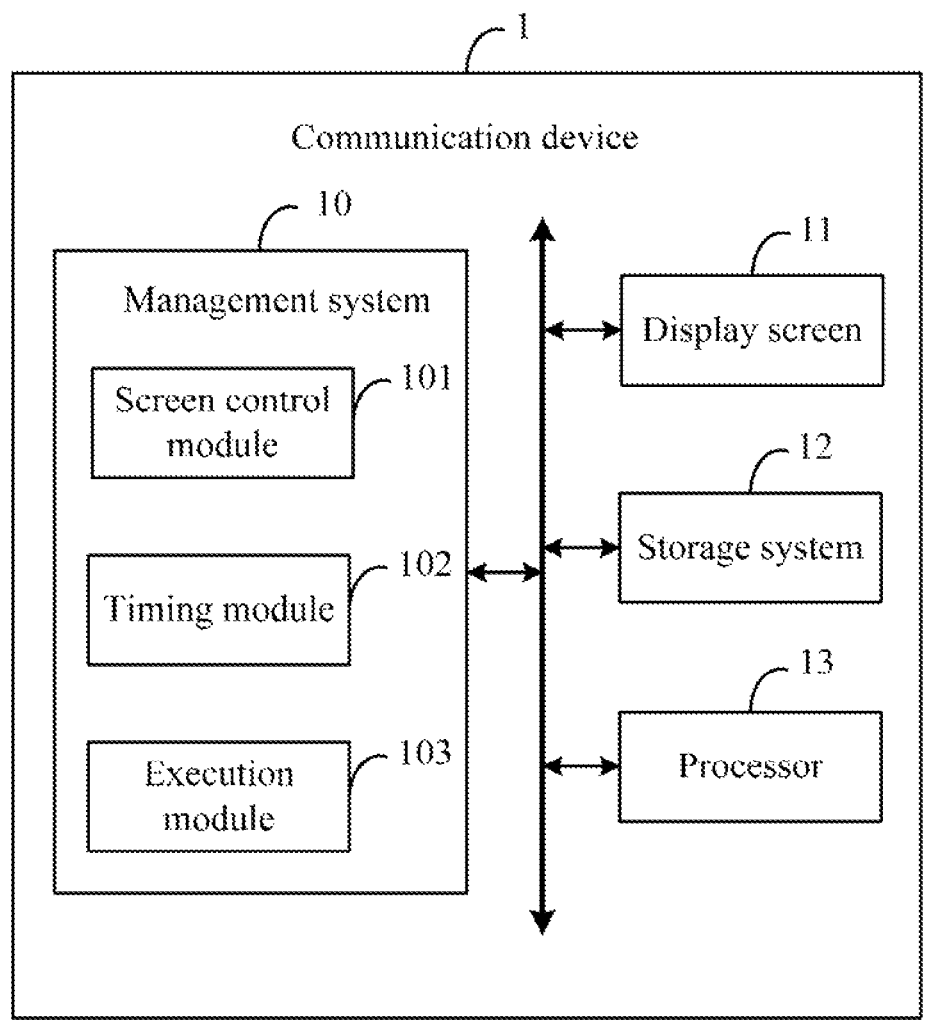
FIG. 1 is a block diagram of one embodiment of a communication device including a management system.
Figure 2:
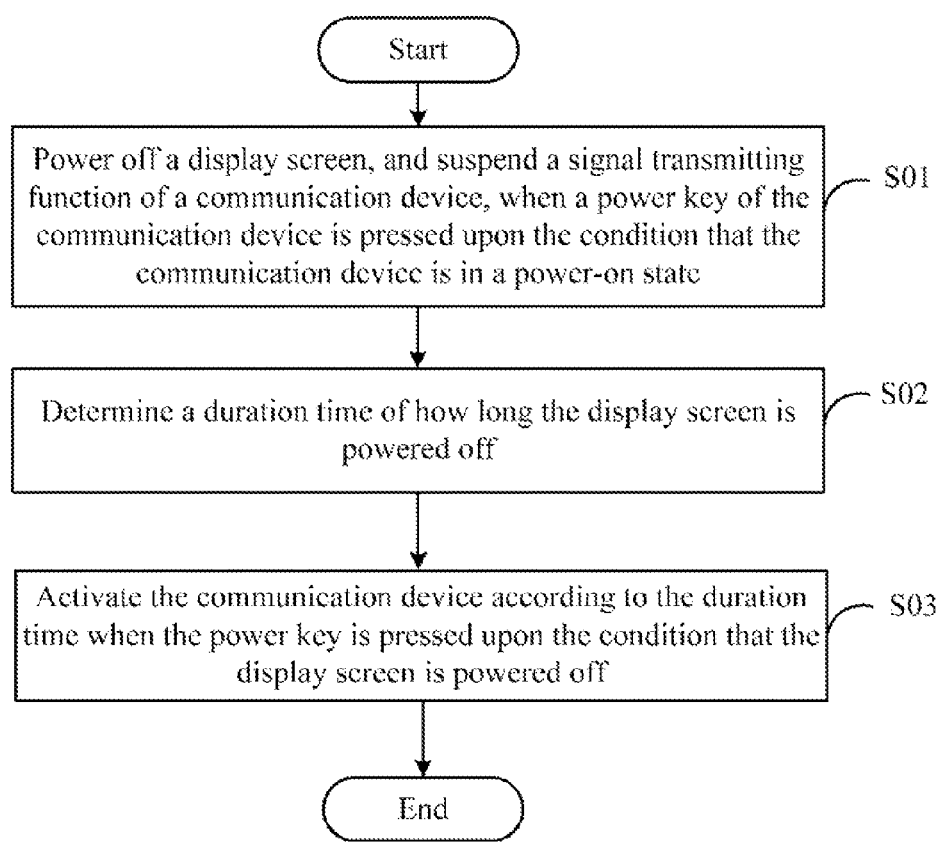
FIG. 2 is a flowchart of one embodiment of a power-on/off management method of the communication device of FIG. 1.

FIG. 1 is a block diagram of one embodiment of a communication device 1 including a management system 10. In the embodiment, the device 1 further includes a display screen 11, a storage system 12, and a processor 13. The management system 10 is operable to manage a power on/off process of the device 1, details are provided below. In one embodiment, the device 1 may be, for example, a mobile phone, a personal digital assistant (PDA), or other device that has wireless communication abilities. It should be understood that FIG. 1 is only one example of the device 1, and other devices may be included with more or less components than shown in other embodiments, or have a different configuration of the various components.

The management system 10 may include a plurality of software programs in form of one or more computerized instructions that are stored in the storage system 12, and executed by the processor 13 to perform operations of the device 1. In the embodiment, the management system 10 includes a screen control module 101, a timing module 102, and an execution module 103. In general, the word "module", as used herein, refers to logic embodied in hardware or firmware, or to a collection of software instructions, written in a programming language, such as, Java, C, or assembly. One or more software instructions in the modules may be embedded in firmware, such as EPROM. The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

The screen control module 101 is operable to power off the display screen 11 when a power key of the device 1 is pressed, and suspends a signal transmitting function of the device 1, upon the condition that the device 1 is in a power-on state. In one embodiment, the screen control module 101 may set the device 1 to be in a flight mode of the device 1 to suspend the signal transmitting function. The flight mode is defined as a setting available on communication devices (e.g., cell phones) that, when engaged, suspends signal transmitting functions of the communication devices. It denotes that a user may want to power off the device 1 by pressing the power key under the power-on state of the device 1. When the display screen 11 is powered off and the signal transmitting function is suspended, the device 1 is in a low power consumption state. Moreover, it looks as if the device 1 is powered off, but actually, a shutdown program of the device 1 has not been implemented to completely power off the device 1, so the device 1 is in a simulative power-off state.

The timing module 102 is operable to determine a duration time of how long the display screen 11 is powered off. When the duration time exceeds a preset maximum threshold time, such as, eight hours, or twelve hours, the timing module 102 is further operable to trigger the device 1 to implement the shutdown program, to completely power off the device 1. In one embodiment, the timing module 102 may start a timer of the device 1 to determine the duration time.

The execution module 103 is operable to activate the device 1 according to the duration time, when the power key is pressed upon the condition that the display screen 11 is powered off. Details of activating the device 1 according to the duration time are described as below.

If the duration time is less than a preset minimum threshold time, such as, one second, or two seconds, it may denote that the purpose of the user to press the power key under the power-on state of the device 1 is to reset the device 1. For example, when an application of the device 1 does not work normally, the device 1 may need to be reset. Therefore, the execution module 103 may activate the device 1 by rebooting up an operating system (OS) of the device 1, powering on the display screen 11, and activating the signal transmitting function of the device 1.

If the duration time is greater than or equal to the minimum threshold time, and less than the maximum threshold time, it may denote that the user wants to power off the device 1 by pressing the power key under the power-on state of the device, so he is not disturbed for some particular occasions, such as, when the user is presenting a meeting. However, if the duration time does not exceed the maximum threshold time, the device 1 has not been completely powered off. Therefore, the execution module 102 may activate the device 1 by powering on the display screen 11, and activating the signal transmitting function of the device 1.

In the embodiment, it is not necessary to repower the other hardware of the device 1 because the device 1 has not been completely powered off if the duration time is less than the maximum threshold time. In addition, when the display screen 11 is powered on, the execution module 103 further displays a boot animation on the display screen 11 to simulate a booting process of the device 1. The boot animation may be a preset short animated video.

If the duration time is greater than or equal to the maximum threshold time, the device 1 may be regarded as not being used for a long period of time, and being completely powered off by implementing the shutdown program. Therefore, the execution module 103 may activate the device 1 by powering on all hardware of the device 1, booting up the operating system, and implementing other necessary programs of the device 1.

FIG. 3 is a flowchart of one embodiment of a power-on/off management method of the communication device 1 of FIG. 1. Depending on the embodiment, additional blocks may be added, others removed, and the ordering of the blocks may be changed.

In block S01, the screen control module 101 powers off the display screen 11, and suspends the signal transmitting function of the device 1, when a power key of the device 1 is pressed upon the condition that the device 1 is in the power-on state. In one embodiment, the screen control module 101 may set the device 1 in a flight mode to suspend the signal transmitting function as described above.

In block S02, the timing module 102 determines a duration time of how long the display screen 11 is powered off. When the duration time exceeds a preset maximum threshold time, such as, eight hours, or twelve hours, the timing module 102 further triggers the device 1 to implement the shutdown program, to power off the device 1.

In block S03, the execution module 103 activates the device 1 according to the duration time, when the power key is pressed upon the condition that the display screen 11 is powered off.

In one embodiment, if the duration time is less than a preset minimum threshold time, such as, one second, or two seconds, the execution module 103 may activate the device 1 by rebooting up the operating system of the device 1, powering on the display screen 11, and activating the signal transmitting function of the device 1. If the duration time is greater than or equal to the minimum threshold time, and less than the maximum threshold time, the execution module 102 may activate the device 1 by powering on the display screen 11, and activating the signal transmitting function of the device 1. And when the display screen 11 is powered on, the execution module 103 further displays a boot animation on the display screen 11 to simulate a booting process of the device 1. Or if the duration time is greater than or equal to the maximum threshold time, the execution module 103 may activate the device 1 by powering on all hardware of the device 1, booting up the operating system, and implementing other necessary program of the device 1.

Although certain embodiments of the present disclosure have been specifically described, the present disclosure is not to be construed as being limited thereto. Various changes or modifications may be made to the present disclosure without departing from the scope and spirit of the present disclosure.

What is claimed is:

1. A power-on/off management method of a communication device, the method comprising:
    powering off a display screen of the communication device and suspending a signal transmitting function of the communication device, when a power key of the communication device is pressed upon the condition that the communication device is in a power-on state;
    determining a duration time of how long the display screen is powered off;
    triggering the communication device to implement a shutdown program to power off the communication device, when the duration time exceeds a preset maximum threshold time; and
    activating the communication device according to the duration time when the power key is pressed upon the condition that the display screen is powered off, the communication device being activated by:
        rebooting up an operating system of the communication device, powering on the display screen and activating the signal transmitting function of the communication device, when the duration time is less than a preset minimum threshold time;
        powering on the display screen and activating the signal transmitting function of the communication device, when the duration time is greater than or equal to the minimum threshold time and less than the maximum threshold time; or
        powering on all hardware of the communication device and booting up the operating system, when the duration time is greater than or equal to the maximum threshold time.

2. The method according to claim 1, further comprising:
    displaying a boot animation on the display screen to simulate a booting process of the communication device, when the display screen is powered on.

3. A communication device, comprising:
    a display screen;
    at least one processor;
    a storage system; and
    one or more programs stored in the storage system and being executable by the at least one processor, the one or more programs comprising:
    a screen control module that powers off the display screen and suspends a signal transmitting function of the communication device, when a power key of the communication device is pressed upon the condition that the communication device is in a power-on state;
    a timing module that determines a duration time of how long the display screen is powered off;
    the timing module further triggers the communication device to implement a shutdown program to power off the communication device, when the duration time exceeds a preset maximum threshold time; and
    an execution module operable to activate the communication device according to the duration time when the power key is pressed upon the condition that the display screen is powered off, the communication device being activated by:
        rebooting up an operating system of the communication device, powering on the display screen and activating the signal transmitting function of the communication device, when the duration time is less than a preset minimum threshold time;
        powering on the display screen and activating the signal transmitting function of the communication device, when the duration time is greater than or equal to the minimum threshold time, and less than the maximum threshold time; or
        powering on all hardware of the communication device and booting up the operating system, when the duration time is greater than or equal to the maximum threshold time.

4. The communication device according to claim 3, wherein the execution module further displays a boot animation on the display screen to simulate a booting process of the communication device, when the display screen is powered on.

5. A non-transitory storage medium storing a set of instructions, the set of instructions capable of being executed by a processor of a communication device, to perform a power-on/off management method of the communication device, the method comprising:
    powering off a display screen of the communication device and suspending a signal transmitting function of the communication device, when a power key of the communication device is pressed upon the condition that the communication device is in a power-on state;

determining a duration time of how long the display screen is powered off;

triggering the communication device to implement a shutdown program to power off the communication device, when the duration time exceeds a preset maximum threshold time; and activating the communication device according to the duration time when the power key is pressed upon the condition that the display screen is powered off, the communication device being activated by:

rebooting up an operating system of the communication device, powering on the display screen and activating the signal transmitting function of the communication device, when the duration time is less than a preset minimum threshold time;

powering on the display screen and activating the signal transmitting function of the communication device, when the duration time is greater than or equal to the minimum threshold time, and less than the maximum threshold time; or powering on all hardware of the communication device and booting up the operating system, when the duration time is greater than or equal to the maximum threshold time.

6. The storage medium as claimed in claim 5, further comprising:

displaying a boot animation on the display screen to simulate a booting process of the communication device, when the display screen is powered on.

* * * * *